Feb. 8, 1966 C. L. HERSHBERGER 3,233,745
SADDLE RACK
Filed Sept. 21, 1964
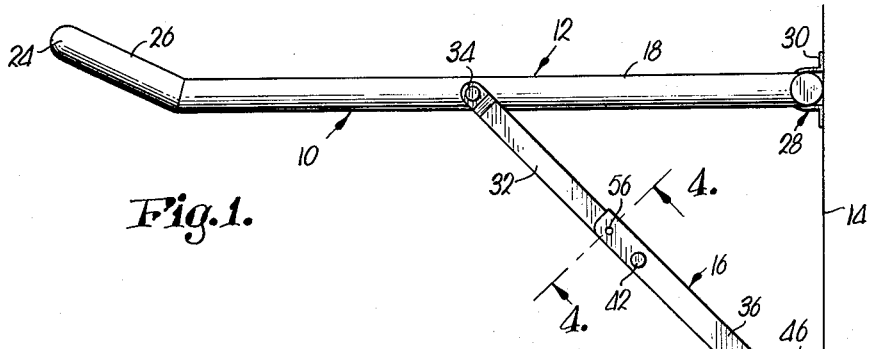
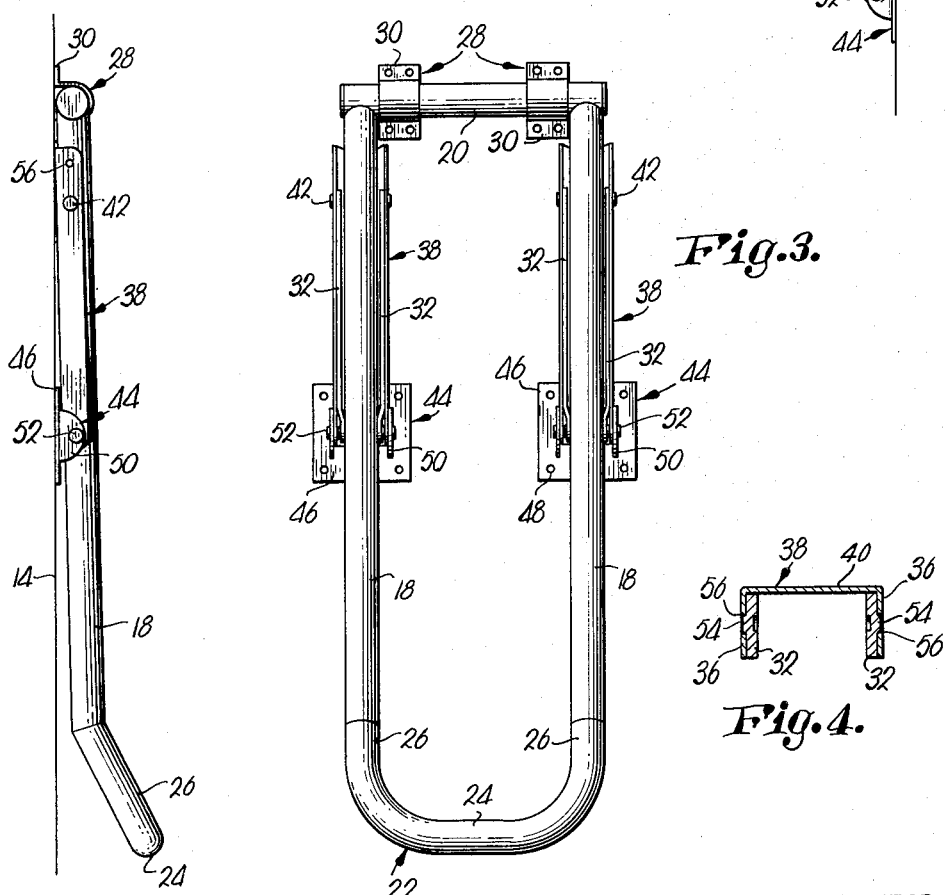
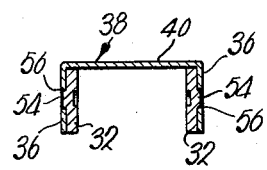
INVENTOR.
Charles L. Hershberger
BY
*Hovey, Schmidt, Johnson & Hovey*
ATTORNEYS.

United States Patent Office 3,233,745
Patented Feb. 8, 1966

3,233,745
SADDLE RACK
Charles L. Hershberger, Joplin, Mo., assignor to H & H Manufacturing Company, Inc., Joplin, Mo., a corporation of Missouri
Filed Sept. 21, 1964, Ser. No. 397,679
3 Claims. (Cl. 211—104)

This invention relates to support structure, and more particularly, to a rack adapted for mounting on a generally upright surface for supporting a saddle thereon.

Racks have heretofore been used for supporting saddles during periods when the saddles are not actually being used, both for displaying or storing the saddle, as well as for holding the saddle to permit cleaning or repair thereof. The desirability of having the saddle stored in or near the stable, barn, horse trailer or saddle showroom often dictates the installation of the saddle-supporting racks in comparatively close quarters or in passages where the presence of the rack projecting from a wall or the like is undesirable when the saddle is on the horse.

Accordingly, it is the primary object of this invention to provide a rack which may be installed on a supporting surface, yet which does not constitute an obstruction projecting from the surface when the rack is not in use. In the achievement of this objective, it is an object of the instant invention to provide a rack which is swingable from a saddle-supporting position projecting outwardly from the supporting surface to a stand-by position lying substantially along or parallel with the surface when the rack is not being used.

Another important object of this invention is to provide such a rack having novel brace elements constructed to permit folding of the rack into its stand-by position without sacrificing the structural rigidity and sturdiness desirable for supporting relatively heavy loads such as saddles.

Still another important object of this invention is to provide novel rack braces comprised of relatively swingable sections configured to receive the rack members therein and to fold upon one another in a manner to minimize the projecting of the rack from its supporting surface when the rack is folded to its stand-by position.

Still other important objects of this invention will be further explained or will become apparent from the following specification and appended claims.

In the drawing:

FIGURE 1 is a side elevational view of a rack constructed pursuant to this invention shown in the supporting position thereof;

FIG. 2 is a side elevational view of the rack from the side opposite that shown in FIG. 1, showing the rack in its stand-by position;

FIG. 3 is a front elevational view of the rack shown in FIG. 2; and

FIG. 4 is a cross-sectional view taken along line 4—4 of FIG. 1.

A saddle rack constructed pursuant to the principles of this invention is broadly designated 10 and includes an elongated, rigid support structure broadly designated 12 adapted to be swingably mounted on a generally upright surface 14 and a pair of identical brace elements 16 for supporting structure 12.

Structure 12 comprises a pair of rigid, elongated, parallel, spaced members 18 interconnected at the end thereof proximal surface 14 by a crossbar 20. The ends of members 18 remote from surface 14 are interconnected by a U-shaped, planar end portion 22 comprising a bight section 24 interconnecting a pair of parallel legs 26, the respective legs 26 being integral with a corresponding end of a member 18 as shown in FIGS. 1 and 3. The plane of portion 22 is disposed at an angle with respect to an imaginary plane defined by the longitudinal axes of members 18 as shown best in FIGS. 1 and 2.

A pair of U-shaped brackets 28 are disposed in partial encircling disposition around crossbar 20 and are provided with integral flanges 30 for pivotally coupling structure 12 to surface 14. Each member 18 has a brace element 16 comprising a pair of elongated, rigid straps 32 extending in spaced parallelism from either side of member 18. One end of each pair of straps 32 is pivotally coupled to a member 18 by a pin 34 for swinging movement relative to member 18 about a substantially horizontal axis. The other ends of each pair of straps 32 are each pivotally coupled to the inner surface of a corresponding flange 36 of a generally U-shaped channel member 38 comprising a web 40, and a pair of spaced, parallel, depending flanges 36.

It will be noted in FIG. 1 that straps 32 are pivotally coupled with flanges 36 by pin means 42 disposed intermediate the ends of member 38 whereby a substantial portion of web 40 overlies the straps 32 when brace element 16 is disposed with the strap section thereof in longitudinal alignment with the section comprised of U-shaped member 38.

A wall bracket 44 comprising a substantially flat plate 46 provided with holes 48 for mounting bracket 44 to surface 14, and a pair of upstanding, parallel flanges 50, is pivotally coupled to each member 38 by a pin 52 to permit swinging of brace element 16 on a substantially horizontal axis about pin 52. It will be noted from the drawing that bracket 44 is disposed in vertically spaced relationship from bracket 28 and in disposition whereby each brace element 16 substantially underlies a corresponding member 18 of structure 12.

Each strap 32 is provided with an outwardly projecting boss 54, shown best in FIG. 4, which is received in a hole 56 drilled in each flange 36 of member 38 and positioned for registering with boss 54 when element 16 is in the position shown in FIG. 1. Thus, boss 54 and hole 56 serve as locking means for frictionally holding the sections of element 16 in longitudinal alignment for stabilizing the structure 12.

When it is desired to utilize rack 10 for supporting a saddle on structure 12, the rack is swung through an arc about the longitudinal axis of crossbar 20 to the position shown in FIG. 1. The sections of brace element 16 are locked into the position shown, whereby a relatively heavy load, such as a saddle, may be adequately supported by structure 12.

The upturned end portion 22 insures that the saddle will not slip off or be inadvertently jostled from its supported position on rack 10. When rack 10 is no longer needed for supporting a saddle thereon, it may be quickly and easily rotated to a stand-by position by manually disengaging the interlocked sections of elements 16 simply by pushing upwardly thereon near the point of interengagement of boss 54 in hole 56. The spacing between flanges 36 of members 38 permits the parallel straps 32 of each brace element 16 to be received between the flanges 36 as the element 16 is folded. Similarly, the spacing between straps 32 of each element 16 permits a corresponding member 18 to be received between the straps 32 as structure 12 is swung to the stand-by position thereof extending substantially parallel with surface 14 as illustrated in FIGS. 2 and 3. This insures that rack 10 is foldable to the greatest possible extent against surface 14 for minimizing the projecting thereof outwardly from surface 14 when rack 10 is not in use.

Web 40 of each element 16 overlies a substantial portion of the corresponding straps 32, the web 40 serving to limit the swinging movement of the sections of element 16 to enhance the structural rigidity of the latter when the sections thereof are in longitudinal alignment, as shown in FIG. 1. This insures that structure 12 is rigidly secured in the saddle-supporting position when the brace element 16 is locked in place.

Having thus described the invention, what is claimed as new and desired to be secured by Letters Patent is:

1. A saddle-supporting rack adapted for mounting on a generally upright surface, comprising:

an elongated support structure;

means adapted for pivotally coupling one end of said structure to said surface for swinging movement of the structure through an arc from a saddle-supporting position with the structure projecting outwardly from the surface to a stand-by position thereof with the structure extending generally parallel to said surface said support structure including a pair of elongated, spaced, substantially parallel members and means interconnecting said members, there being a brace element for each member respectively, each brace element comprising a pair of elongated, pivotally interconnected sections, one of said sections being configured to present a channel extending the entire length thereof, the other section and a corresponding member being received in the channel when the element is collapsed for minimizing the extent of projection of the structure from the surface when the structure is in said stand-by position;

means pivotally coupling one end of each element to the structure intermediate the ends of the latter; and means adaped for pivotally coupling the other end of each element to said surface in vertically spaced relationship from the point of coupling of the structure to the surface, whereby manual collapsing of said elements permits swinging of the structure from said supporting to said stand-by position.

2. A rack as set forth in claim 1, wherein said one section is of U-shaped, transverse cross-sectional configuration having a pair of spaced, parallel flanges and an integral web interconnecting said flanges, and said other section includes a pair of spaced, parallel straps, one end of each strap being pivotally coupled to the inner surface of a corresponding flange intermediate the ends of said one section for swinging relative to said one section through arcs in planes parallel to the corresponding flanges, the other end of each strap being pivotally coupled with a corresponding member, there being a strap on each side of each member respectively, whereby said web extends into the path of swinging movement of said straps for limiting the relative swinging of said sections.

3. A support rack adapted for mounting on a generally upright surface comprising:

a rigid support structure including a pair of elongated, spaced, parallel members, a crossbar extending parallel to said surface interconnecting corresponding proximal ends of the members, and a planar, U-shaped end portion including a pair of parrallel legs integral with corresponding ends of the members remote from the crossbar, and a bight section interconnecting the legs, the plane of the end portion being disposed at an angle with respect to an imaginary plane defined by the longitudinal axis of said members;

bracket means operably coupled with the crossbar and adapted to be secured to said surface for pivotally coupling the structure to the surface;

a brace element for each member respectively, each element including a pair of pivotally interconnected, relatively swingable sections;

means adapted for pivotally coupling one section of each element to the surface in spaced relationship from said bracket means;

means pivotally coupling the other section of each element to a corresponding member intermediate the ends thereof, each section of said elements comprising a pair of spaced-apart components, the spacing of the components of the first section being sufficient to receive the second section therebetween and the spacing of the components of the second section being sufficient to receive a corresponding member therebetween when the sections are swung relatively to permit swinging of the members to a position extending generally parallel to said surface.

References Cited by the Examiner

UNITED STATES PATENTS

| 927,369 | 7/1909 | May | 211—99 |
| 2,349,106 | 5/1944 | Mullan | 15—265 |
| 2,433,275 | 12/1947 | Higby | 211—104 |
| 2,952,366 | 9/1960 | Botten | 211—104 |

FOREIGN PATENTS

| 577,379 | 5/1946 | Great Britain. |
| 274,170 | 6/1951 | Switzerland. |

CLAUDE A. LE ROY, *Primary Examiner.*

J. F. FOSS, *Assistant Examiner.*